(12) United States Patent
Zhang

(10) Patent No.: US 11,235,292 B2
(45) Date of Patent: Feb. 1, 2022

(54) VENTILATION ELEMENT

(71) Applicant: AQSEPTENCE GROUP GMBH, Aarbergen (DE)

(72) Inventor: Jiansan Zhang, Alzenau (DE)

(73) Assignee: AQSEPTENCE GROUP GMBH, Aarbergen (DE)

( * ) Notice: Subject to any disclaimer, the term of this patent is extended or adjusted under 35 U.S.C. 154(b) by 193 days.

(21) Appl. No.: 16/478,811

(22) PCT Filed: Jan. 4, 2018

(86) PCT No.: PCT/EP2018/050170
§ 371 (c)(1),
(2) Date: Jul. 17, 2019

(87) PCT Pub. No.: WO2018/134052
PCT Pub. Date: Jul. 26, 2018

(65) Prior Publication Data
US 2019/0374910 A1    Dec. 12, 2019

(30) Foreign Application Priority Data
Jan. 18, 2017 (DE) ..................... 10 2017 100 938.8

(51) Int. Cl.
*B01F 3/04*     (2006.01)
*B01F 15/02*    (2006.01)

(52) U.S. Cl.
CPC ...... *B01F 3/04255* (2013.01); *B01F 3/04262* (2013.01); *B01F 3/04269* (2013.01);
(Continued)

(58) Field of Classification Search
CPC .............. B01F 3/04255; B01F 3/04262; B01F 3/04269; B01F 15/026; B01F 2003/04297;
(Continued)

(56) References Cited

U.S. PATENT DOCUMENTS 3,490,752 A    1/1970 Danjes et al.
3,754,740 A    8/1973 Piper
(Continued)

FOREIGN PATENT DOCUMENTS

DE    2261994 A1    6/1974
EP    0549518 A1    6/1993
(Continued)

OTHER PUBLICATIONS

Google translation of JPS63152632 (Year: 1988).*
(Continued)

*Primary Examiner* — Stephen Hobson
(74) *Attorney, Agent, or Firm* — Harness, Dickey & Pierce, P.L.C.

(57) ABSTRACT

The invention relates to a ventilation element for the introduction of a gas into a liquid, having at least one gas port, having at least one carrier plate and having at least one elastically deformable diaphragm which is connected to the at least one gas port and/or to the at least one carrier plate. A space that can be formed between the at least one diaphragm and the at least one carrier plate is connected in terms of flow to the gas port. The at least one carrier plate has a multiplicity of gas outlet openings, and at least one diaphragm is composed at least in sections of a material with a lower density than water, or is equipped with at least one float body which has a lower density than water.

11 Claims, 3 Drawing Sheets

Figure 1:
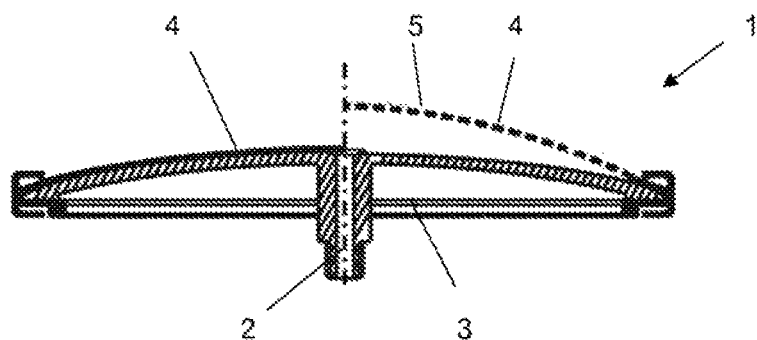

(52) U.S. Cl.
CPC ... *B01F 15/026* (2013.01); *B01F 2003/04297* (2013.01); *B01F 2003/04312* (2013.01)

(58) Field of Classification Search
CPC .......... B01F 2003/04312; Y02W 10/10; C02F 3/201
See application file for complete search history.

(56) References Cited

U.S. PATENT DOCUMENTS

| | | | | |
|---|---|---|---|---|
| 3,953,554 A | * | 4/1976 | Loughridge | ........ B01F 3/04241 261/124 |
| 5,215,686 A | * | 6/1993 | Sheckler | ............ B01F 3/04262 261/122.1 |
| 2008/0226920 A1 | * | 9/2008 | Parkinson | ................. B32B 7/02 428/411.1 |

FOREIGN PATENT DOCUMENTS

| | | | | |
|---|---|---|---|---|
| JP | S63152632 | * | 10/1988 | |
| JP | S63152632 U | | 10/1988 | |
| JP | 2007190462 A | | 8/2007 | |
| WO | WO-2016041488 A1 | * | 3/2016 | ............. A01N 37/16 |

OTHER PUBLICATIONS

International Search Report (in English and German) of International Search Authority issued in PCT/EP2018/050170, dated Apr. 11, 2018; ISA/EP.

* cited by examiner

VENTILATION ELEMENT

The invention relates to an aeration element for introducing a gas into a liquid. The aeration element preferably has for this purpose at least one gas port, at least one carrier plate and at least one elastically deformable membrane, which is connected to the at least one gas port and/or the at least one carrier plate. In particular, a space that can form between the at least one membrane and the at least one carrier plate, for example when pressure is applied, can be in flow connection with the gas port.

Aeration elements are primarily used in biological wastewater treatment, in order to provide the bacteria of a mixture of sludge and water with dissolved oxygen, in order that the organic and inorganic contents in the wastewater are broken down or oxidized.

According to the type of oxygen input, a distinction is made between mechanical aeration (also known as surface aeration) and compressed air aeration. Aqseptence Group GmbH offers for example under the trade name MAMMUTROTOR® mechanical aeration systems, wherein oxygen from the air is brought into intensive contact with water by means of a horizontally rotating roller and in this way the oxygen is introduced into the water.

Aqseptence Group GmbH also offers under the trade names ROEFLEX® and BIOFLEX® compressed air aeration elements in which compressed air is produced by means of blowers or compressors and brought by a system of distributing pipes to the individual aeration elements, which are installed at the bottom of the biological reaction tank. There, the compressed air emerges from the special openings in the elements as individual bubbles, which rise up through the mixture of sludge and water to the surface of the water, wherein an intensive mass transfer between the air bubbles and the water takes place as the bubbles rise up, and the oxygen is thereby dissolved into the water.

Aeration pipes of rigid metal or plastic are used almost exclusively for producing mixtures and circulating flows of water by large air bubbles, for example in aerated sand traps, and tend to be unsuitable for good oxygen input. What is more, deposits rapidly form in such aeration pipes and they become clogged by solid particles, which settle inside the pipes as soon as the supply of air is stopped.

There are large- and medium-bubble aeration pipes of rigid metal or plastic, fine-bubble aerators with a ceramic outgassing part and medium- and fine-bubble aerators with a perforated, elastic membrane of EPDM, silicone or TPU, which is pulled onto a rigid supporting body and fastened. At the same time, the aerators may be designed in the form of round or oval pipes, round plates, relatively small, elongate plates or large, rectangular plates. The perforation of the membranes may differ in shape, size and density, while the thickness of the membranes is usually adapted to the design and the mechanical loading.

Ceramic aerators are also being used less and less, in spite of good oxygen input characteristics, because the ceramic outgassing part, either as a round or rectangular plate or as a pipe, can easily become clogged by solid sludge particles as soon as the supply of air is stopped, or because the fine ceramic capillaries tend to become blocked by biological accretion. This requires that they must be frequently chemically cleaned. For this purpose, the ceramic parts must have a certain minimum thickness in order to offer enough compressive strength (difference in pressure on the inside and outside) and resistance to breakage, while accepting greater pressure losses as the bubbles emerge.

There are also some cases in which aerators which consist of a rigid material with a very fine slit formation are offered, these being among the fine-bubble aerators.

The cost-effectiveness of the compressed air aeration systems depends on various factors, to be specific including the size of the bubbles produced, the pressure loss when the air leaves the aerators, the uniformity of the size of bubbles and the surface-area distribution.

In modern wastewater treatment, mainly fine-bubble membrane aerators are used, because, apart from the relatively good oxygen input properties, they are very resistant to becoming clogged. What is more, when there are interruptions in operation, the openings close again, so that such aerators are also suitable for flexible operation.

FIG. 1 schematically shows such a membrane aerator, as sold by Aqseptence Group GmbH under the trade name ROEFLEX®, in a sectional view. This aerator 1 consists substantially of a central gas supply 2, a rigid carrier plate 3 and a flexible membrane 4, which is hermetically connected to the carrier plate 3. The membrane 4 is provided with a perforation 5, from which gas can escape when gas under a positive pressure is introduced into the aerator 1 from the gas supply 2. As this happens, the membrane 4 lifts off from a supporting structure of the carrier plate 3, so that a space filled with gas is produced between the carrier plate 3 and the membrane 4. The left side in FIG. 1 shows here the state of the aerator 1 when no gas is supplied, whereas the right side in FIG. 1 shows the state when gas is introduced into the aerator 1.

The disadvantages of the membrane aerators are for example that the compressed air must first spread open the perforation (for example narrow slits), in order to emerge as bubbles. This involves loss of energy in the form of pressure loss. The pressure loss becomes greater if smaller slitting or pinpricks are chosen in order to produce smaller bubbles, and thereby achieve an improved oxygen transfer. On the other hand, on account of the difference in pressure between the inner side and the outer side of the membrane in the case of membranes that are flat or in sheet form, a bulging of the membrane occurs, becoming greater the further away the position is from the locations where it is fastened or attached. This bulging lead to an uneven distribution of the bubbles, since to some extent more bubbles emerge at locations where there is greater bulging. There may also be a kind of constriction of the bubbles as they rise up, which leads to greater coalescence, and consequently to larger bubbles and poorer oxygen transfer.

The present invention has the object of forming an improved compressed air aerator that avoids the disadvantages described above and achieves a good oxygen transfer.

This object is achieved according to the invention for an aeration element of the type mentioned at the beginning substantially by the at least one carrier plate having a multiplicity of gas outlet openings and the at least one membrane consisting at least in certain portions of a material with a lower density than water and/or being provided with at least one float, which has a lower density than water. In particular, an aeration element according to the invention consists of a gas supply, a carrier plate and a membrane.

A central concept of the invention is to use a finely perforated, rigid plate (carrier plate), which may for example consist of metal or plastic, as a flat outgassing surface. In the installed position, i.e. when the aeration element according to the invention is being used for introducing gas into a liquid, the carrier plate faces upward and the membrane is arranged under the carrier plate.

Since the membrane either has a lower density itself than water and/or experiences uplift by means of floats, the membrane is brought into contact with the carrier plate from below when no gas is introduced into the aeration element by the gas supply. In the state of rest, i.e. without compressed air being supplied, the membrane lies closely up against the perforated plate from below, and consequently closes the openings in the outgassing plate (carrier plate) from below. This prevents water and/or dirt particles from being able to penetrate into the interspace between the membrane and the carrier plate. Both the buoyancy of the membrane and to a very small extent the slightly higher water pressure from below, as compared with the water pressure from the upper side of the rigid plate, contribute to this. When compressed air is supplied, the flexible membrane is pressed downward, against its buoyancy, whereby an extended interspace is created, making it possible for the compressed air to reach all of the perforated openings in the rigid outgassing plate and pass through them into the water.

The air supply to the aeration element designed in such a way may be formed such that, in the state of rest, it is additionally closed by the membrane, and consequently prevents water and dirt particles from being able to get into the air distribution system even when there are leaks in the aeration element.

Preferably, the at least one carrier plate and the at least one membrane are formed as disks, for example circular disks, which in the unloaded state lie at least in certain regions one on top of the other and which are hermetically connected to one another at their outer periphery. This connection allows the formation between the carrier plate and the membrane of a gas-tight space, which inflates when gas is supplied, in order to achieve the effect that the gas outlet openings are evenly supplied, and without a supply of gas assumes a minimal volume. This minimal volume may be so small that the membrane lies flat over the carrier plate, without any appreciable gas inclusions being present between the membrane and the carrier plate.

The at least one carrier plate and the at least one membrane are connected to one another at their outer periphery, for example by means of a clamping element and/or a screwed connection. Such a clamping element may be a collar, for example a surrounding collar, which keeps the membrane and the carrier plate pressed against one another. For this purpose, the membrane and/or the carrier plate may for example be provided with a bead, which engages in a corresponding depression in the clamping element.

Conversely, a bead of the clamping element may also engage in a depression in the membrane or the carrier plate. As an alternative or in addition to this, the at least one carrier plate and the at least one membrane may be connected to one another at their outer periphery by means of an adhesive bond and/or welded joint.

Preferably, the at least one carrier plate consists of a material that is stiffer in comparison with the membrane, in particular of metal or plastic. In particular metal materials, such as for example high-grade steel, and also high-strength plastics have the advantage of sufficient mechanical stability as an element, even with very small wall thicknesses, and sufficient resistance to the difference in pressure between above and below the gassing plate (carrier plate). It is consequently possible that a further minimization of the pressure loss when the air bubbles emerge can be achieved by selective choice of thinner wall thicknesses.

As compared with the membrane aeration elements that are currently often used, the aeration elements formed according to this invention also have the advantage that the material surface of the rigid outgassing surface (carrier plate) can be specially treated, for example coated or treated in such a way that the air bubbles tend rather to form droplets, or have better resistance to bacterial accretions, contaminations and depositions, while such measures are difficult to achieve with soft, flexible membranes. With outgassing surfaces of plastic, it is possible already when selecting the blends of materials to choose the contents in such a way that the desirable properties described above are taken into account. In this way, a further improvement of the oxygen input can be achieved and the durability is improved. In particular, the at least one carrier plate may be provided with a coating and/or finish which is conducive to the gas bubbles forming droplets and/or counteracts bacterial accretions, contaminations and/or depositions.

Preferably, the at least one membrane is a soft, flexible plastic membrane, which consists of a water- and air-impermeable material. According to one embodiment of the invention, the at least one membrane is not provided with gas outlet openings.

A particularly expedient structure of the at least one membrane provides that it has at least in certain portions a multilayered structure, wherein air bubbles and/or floats, which have a lower density than water, are enclosed between two layers of the at least one membrane. As an alternative or in addition, the at least one membrane may be connected on its side facing away from the at least one carrier plate to at least one float, which has a lower density than water, and/or comprises an open or closed gas cushion. These measures have the effect that the membrane, which is for example much lighter than water, floats in it. Preferably, the membrane is provided with such a thickness that sufficient buoyancy is formed. Thus, the water-impermeable membrane may for example enclose air bubbles or lightweight foam particles, and thereby produce sufficient buoyancy. The buoyant membrane is fastened under the rigid outgassing plate and at the periphery is connected together with the outgassing plate in a sealed manner, and fastened. In other words, the float parts or air cushionings may be adhesively attached to the membrane from below or enclosed in the membrane, or the membrane may be at least partially completely produced from such a lightweight and buoyant material. For a membrane with a float, it is also possible to impart the buoyancy by a separate float placed on from below, without it being connected to the membrane located above it so as to form a unit.

The aeration elements designed according to this invention may assume various geometrical shapes, for example round plates, rectangular large plates with one or more air supply ports, narrow or elongate plates. At a suitable location, for example in the middle of a round outgassing plate, an opening is provided and is connected to the compressed air distribution system, in order to supply compressed air between the rigid, perforated plate and the flexible, not air-permeable membrane.

The aforementioned design has the advantage that the openings for the emergence of air and formation of bubbles are already in an open state, and no longer have to be opened by exerting energy. At the same time, even smaller opening sizes or opening dimensions can be chosen, without having to fear that the pressure loss when the air emerges, if applied appropriately, would increase excessively. This also opens up the possibility of producing smaller uniform bubbles with a smaller opening size and much greater opening density, and consequently of achieving an improvement in the oxygen yield.

With the aeration elements designed according to this invention, it is also possible to choose the density of the perforations as required in terms of process engineering, such as for example smaller perforations with a high density for better oxygen input efficiency, or larger perforations with a lower density for better intermixing performance.

Figure 2:
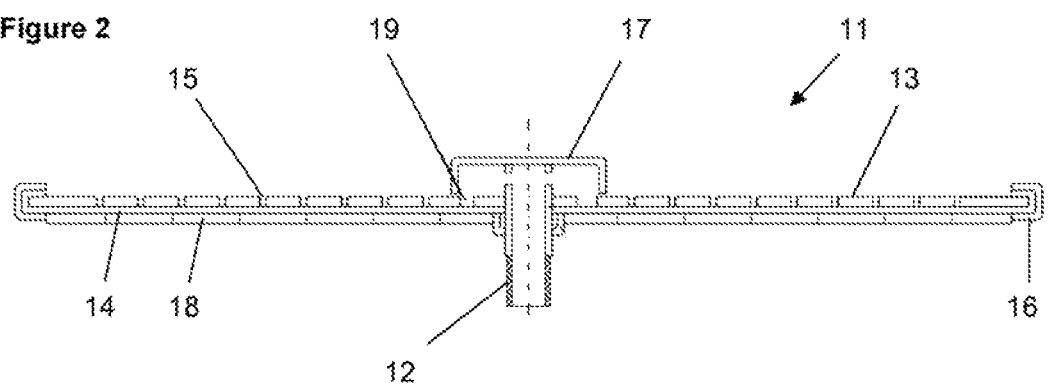
Figure 3:
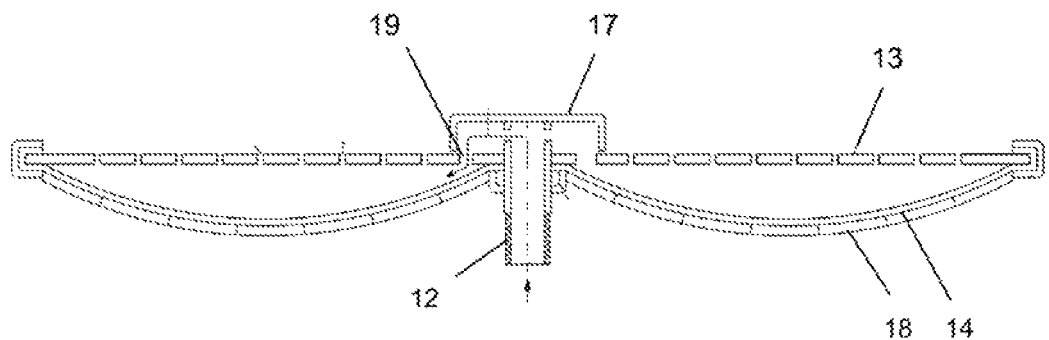
Figure 4:
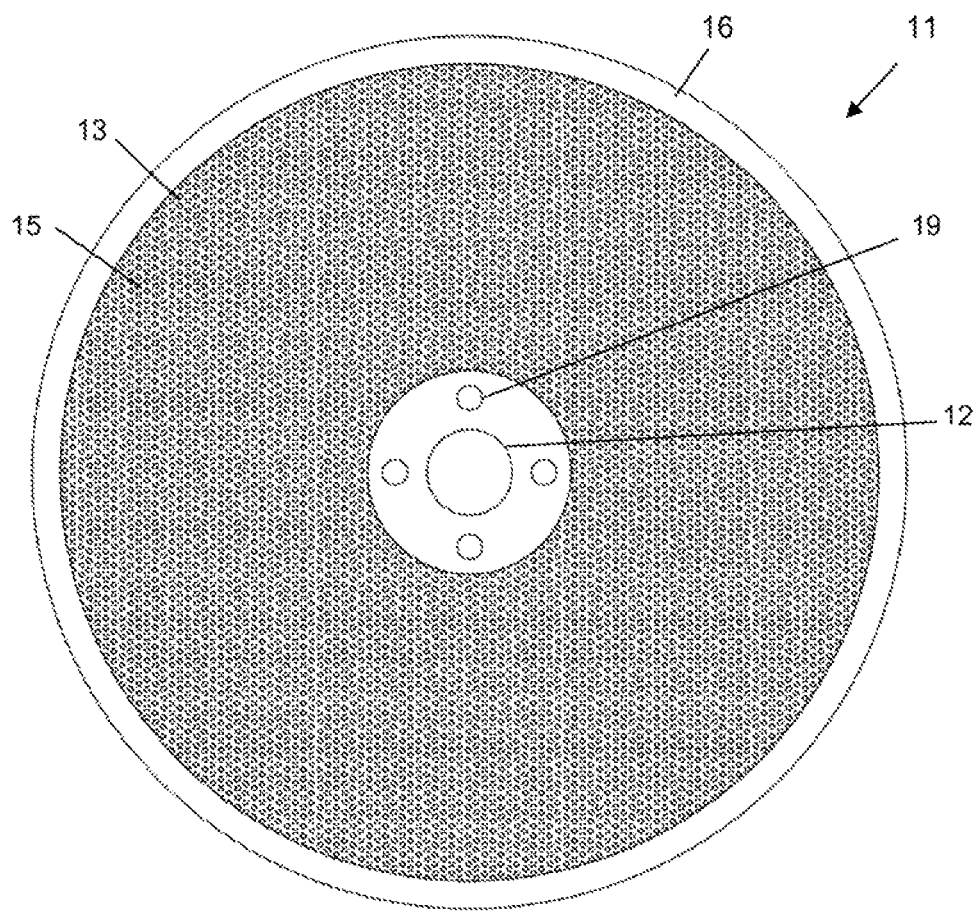
Figure 5:
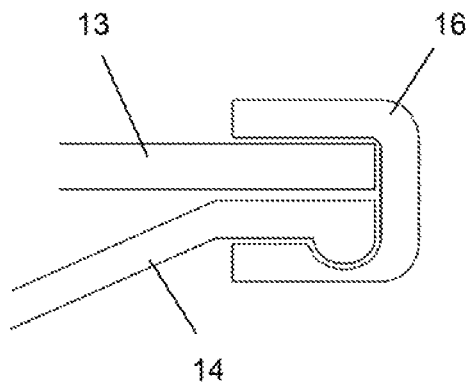
Figure 6:
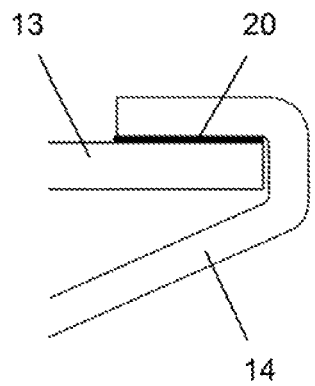
Figure 7:
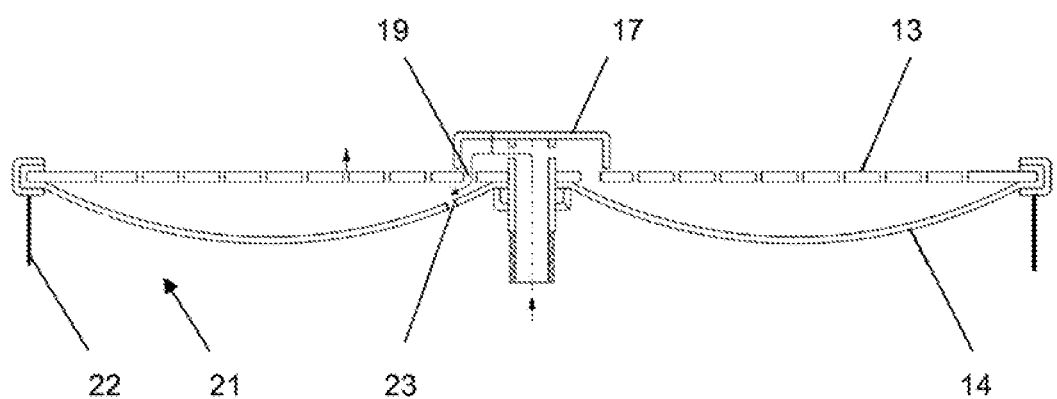

Developments, advantages and application possibilities of the invention also emerge from the following description of an exemplary embodiment and the drawing. All features described and/or graphically represented form the subject matter of the invention on their own or in any combination, independently of how they are included together in the claims or their back-reference. Schematically, FIG. 1 shows a section through an aeration element according to the prior art, FIG. 2 shows a section through an aeration element according to the invention in the unloaded state, FIG. 3 shows a section through the aeration element as shown in FIG. 2 in the state in which pressure is applied, FIG. 4 shows a partially sectioned plan view of the aeration element as shown in FIGS. 2 and 3, FIG. 5 shows in a sectional view a detail of the aeration element as shown in FIGS. 2 and 3, FIG. 6 shows in a sectional view a detail of an alternative aeration element, and FIG. 7 shows a section through an aeration element according to the invention as provided by a further embodiment.

The aeration element 11 represented in the exemplary embodiment of FIGS. 2 to 5 has a central gas port 12, by way of which pressurized air can be introduced into the aeration element 11. The aeration element 11 is formed substantially by a carrier plate 13 and a membrane 14 fastened thereto. In the embodiment represented, the carrier plate 13 is a flat circular disk of a stiff material, for example high-grade steel or plastic. The carrier plate 13 is provided with a multiplicity of gas outlet openings 15, by way of which air can emerge from the aeration element 11.

In the embodiment represented, the membrane 14 is likewise designed as a circular disk, which is fastened by its outer periphery to the carrier plate 13 by means of a clamping element 16. As can be seen from the view of a detail in FIG. 5, the membrane 14 may for this purpose be provided on its outer periphery with a bead, which engages in a corresponding clearance in the clamping element 16. The membrane 14 has a central opening, with which it lies against the gas port 12 in a sealing manner or can be connected by way of a screwed connection.

In the embodiment represented, the gas port 12 is provided with a cap-like central air distributor 17, which is connected for example in a sealing manner to the carrier plate 13. Air can pass from the gas port 12 into an interspace between the carrier plate 13 and the membrane 14 by way of through-openings 19 in the carrier plate 13. As a result, the membrane 14 is transformed from its state shown in FIG. 2, lying flat on the carrier plate 13, into the state shown in FIG. 3, in which the membrane 14 lifts off from the carrier plate 13. It can be seen here that, in the state of FIG. 2, the membrane 14 closes the gas outlet openings 15 in the carrier plate 13, whereas in FIG. 3 the gas outlet openings 15 are not covered by the membrane 14.

Arranged on the lower side of the membrane 14 in FIGS. 2 and 3 are floats 18, which are for example connected to the membrane 14. As an alternative to this, the floats 18 may merely lie against the membrane 14 or be integrated in the membrane 14. In particular, the membrane 14 itself may also consist of a material that has a lower density than water. As a result, the membrane 14 is pressed against the carrier plate 13 when the aeration element 11 is immersed in a liquid or sludge. As a result, the gas outlet openings 15 of the carrier plate 13 are closed particularly effectively by the membrane 14.

In the plan view of FIG. 4, the central air distributor 17 is represented in a sectional manner, so that the gas port 12 can be seen as a central opening. Also shown in the example represented are four through-openings 19, by way of which compressed air can pass from the gas port 12 via the central air distributor 17 into the interspace between the carrier plate 13 and the membrane 14.

In FIG. 6, an alternative to the fastening of the membrane 14 on the carrier plate 13 as shown in FIG. 5 is represented. In the exemplary embodiment as shown in FIG. 6, a separate clamping element may be omitted if the membrane 14 is adhesively bonded or welded to the carrier plate 13 by means of an adhesive layer 20. For this purpose, the membrane 14 may, as represented in FIG. 6, be brought up onto the side of the carrier plate 13 that is the upper side in the installation position and connected there to the carrier plate.

In FIG. 7, a further embodiment of an aeration element is represented. Here, the float is formed as a gas or air cushion 21 which is enclosed all around and is provided on the underside (in the installation position represented) of the membrane 14. This gas cushion 21 may be downwardly closed by a further membrane (not shown) or, as shown in FIG. 7, downwardly open. In order to avoid the lateral escape of gas, a bounding wall 22 is provided, for example running around and in the example represented extending downward from the clamping element 16. Such a bounding wall 22 may, however, also be attached directly to the membrane 14 or to the carrier plate 13.

In the first-mentioned alternative of a closed gas cushion 21, it is for example simply required to attach underneath a second membrane (not represented), which may for example be provided with a valve and be filled with air during installation. Alternatively, simply just a surrounding wall is provided by the bounding wall 22, which is filled very gradually with air during operation, for example by way of a small slitting or similar opening 23 in the membrane 14 downward or through a valve. The opening 23 is shown greatly enlarged in FIG. 7 to illustrate its function. It may be considerably smaller in practice. When operation is stopped, this gas cushion 21 then provides the necessary uplift and the closing of the openings 15 of the carrier plate 13 by the membrane 14.

LIST OF DESIGNATIONS

1 Aeration element
2 Gas port
3 Carrier plate
4 Membrane
5 Gas outlet opening
11 Aeration element
12 Gas port
13 Carrier plate
14 Membrane
15 Gas outlet opening
16 Clamping element
17 Central air distributor
18 Float
19 Through-opening
20 Adhesive bonding
21 Gas cushion
22 Bounding wall
23 Opening

The invention claimed is:

1. An aeration element for introducing a gas into a liquid, with at least one gas port, at least one carrier plate and at least one elastically deformable membrane, which is connected to the at least one gas port and/or the at least one carrier plate, wherein a space that can form between the at least one membrane and the at least one carrier plate is in flow connection with the gas port, wherein the at least one carrier plate has a multiplicity of gas outlet openings and the at least one membrane consists at least in certain portions of a material with a lower density than water and/or is provided with at least one float, which has a lower density than water, wherein the at least one membrane has at least in certain portions a multilayered structure, wherein floats, which have a lower density than water, are enclosed between two layers of the at least one membrane and air bubbles are enclosed between the two layers.

2. The aeration element as claimed in claim 1, wherein the at least one carrier plate and the at least one membrane are formed as disks which in the unloaded state lie at least in certain regions one on top of the other and which are hermetically connected to one another at their outer periphery.

3. The aeration element as claimed in claim 2, wherein the at least one carrier plate and the at least one membrane are connected to one another at their outer periphery by means of a clamping element.

4. The aeration element as claimed in claim 2, wherein the at least one carrier plate and the at least one membrane are connected to one another at their outer periphery by means of an adhesive bond and/or welded joint.

5. The aeration element as claimed in claim 1, wherein the at least one carrier plate consists of a stiffer material than the at least one membrane.

6. The aeration element as claimed in claim 1, wherein the at least one carrier plate is provided with a coating and/or finish that is conducive to gas bubbles forming droplets.

7. The aeration element as claimed in claim 1, wherein the at least one carrier plate is provided with a coating and/or finish that counteracts bacterial accretions, contaminations and/or depositions.

8. The aeration element as claimed in claim 1, wherein the at least one membrane is a soft, flexible plastic membrane, which consists of a water- and air-impermeable material.

9. The aeration element as claimed in claim 1, wherein the at least one membrane is connected on its side facing away from the at least one carrier plate to at least one float, which has a lower density than water, and/or comprises an open or closed gas cushion.

10. The aeration element as claimed in claim 2, wherein said disks are circular.

11. The aeration element as claimed in claim 5, wherein said at least one carrier plate is formed from metal or plastic.

* * * * *